United States Patent
Holman

(10) Patent No.: US 7,496,826 B2
(45) Date of Patent: Feb. 24, 2009

(54) METHOD, SYSTEM, AND APPARATUS FOR ADJACENT-SYMBOL ERROR CORRECTION AND DETECTION CODE

(75) Inventor: Thomas J. Holman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/584,059

(22) Filed: Oct. 20, 2006

(65) Prior Publication Data

US 2007/0061675 A1 Mar. 15, 2007

Related U.S. Application Data

(62) Division of application No. 10/624,424, filed on Jul. 21, 2003, now abandoned.

(51) Int. Cl.
*H03M 13/00* (2006.01)

(52) U.S. Cl. .............. 714/785; 714/753; 714/765; 714/784

(58) Field of Classification Search .......... 714/752, 714/753, 765, 785
See application file for complete search history.

(56) References Cited

U.S. PATENT DOCUMENTS

| | | | | |
|---|---|---|---|---|
| 3,728,678 A * | 4/1973 | Tong | ............... | 714/787 |
| 4,740,968 A * | 4/1988 | Aichelmann, Jr. | ............ | 714/703 |
| 5,490,155 A | 2/1996 | Abdoo et al. | | |
| 5,748,652 A | 5/1998 | Kim | | |
| 5,768,294 A * | 6/1998 | Chen et al. | ................. | 714/766 |
| 5,987,629 A * | 11/1999 | Sastry et al. | ................... | 714/48 |
| 6,662,336 B1 * | 12/2003 | Zook | ........................... | 714/786 |
| 6,751,769 B2 * | 6/2004 | Chen et al. | ................. | 714/767 |
| 6,981,196 B2 * | 12/2005 | Davis et al. | ................. | 714/763 |
| 7,234,099 B2 * | 6/2007 | Gower et al. | ................. | 714/767 |
| 2007/0061685 A1 | 3/2007 | Holman | | |
| 2008/0104476 A1 | 5/2008 | Holman | | |

FOREIGN PATENT DOCUMENTS

| EP | 0889407 A2 | 6/1998 |
|---|---|---|
| EP | 0 889 707 A | 1/1999 |
| EP | 0889407 A2 | 1/1999 |
| KR | 0147150 | 9/1998 |

OTHER PUBLICATIONS

International Application No. PCT/US2004/022353, PCT Search Report.
U.S. Appl. No. 10/624,424 Office action mailed Sep. 6, 2006.
"Korean Application No. 10-2006-7001341, Office Action Received, Jan. 29, 2008, 6 pgs."
PCT Search Report Dated Nov. 11, 2004.

* cited by examiner

*Primary Examiner*—Esaw T Abraham
(74) *Attorney, Agent, or Firm*—Caven & Aghevli LLC

(57) ABSTRACT

A circuit and method for generating an Error Correcting Code (ECC) based on an adjacent symbol codeword that is formed in two clock phases among other techniques are described. In one embodiment, an apparatus is to comprise one or more logics to: generate a plurality of check bits based on a set of data, receive a codeword from a memory and to generate a syndrome based on the codeword, and to detect whether an error exists based on the syndrome. In another embodiment, a logic may classify the error if it exists. In a further embodiment, a logic may correct the error if it exists. Other embodiments are also disclosed.

17 Claims, 4 Drawing Sheets

METHOD, SYSTEM, AND APPARATUS FOR ADJACENT-SYMBOL ERROR CORRECTION AND DETECTION CODE

CROSS-REFERENCE TO RELATED APPLICATIONS

This application is a division of U.S. patent application Ser. No. 10/624,424, filed Jul. 21, 2003, now abandoned, entitled "METHOD, SYSTEM, AND APPARATUS FOR ADJACENT-SYMBOL ERROR CORRECTION AND DETECTION CODE" and is related to U.S. patent application Ser. No. 11/585,411, filed Oct. 23, 2006 entitled "METHOD, SYSTEM, AND APPARATUS FOR ADJACENT-SYMBOL ERROR CORRECTION AND DETECTION CODE."

BACKGROUND

1. Field

The present disclosure pertains to the field of memory and computer memory systems and more specifically to error detection and correction for memory errors.

2. Description of Related Art

Error correcting codes (ECC) have been routinely used for fault tolerance in computer memory subsystems. The most commonly used codes are the single error correcting (SEC) and double error detecting (DED) codes capable of correcting all single errors and detecting all double errors in a code word.

As the trend of chip manufacturing is toward a larger chip capacity, more and more memory subsystems will be configured in b-bits per chip (where "b" is the number of bits in output of a memory device. The most appropriate symbol ECC to use on the memory are the single symbol error correcting (SbEC) and double symbol error detecting (DbED) codes, wherein "b" is the width(number of bits in output) of the memory device, that correct all single symbol errors and detect all double symbol errors in a code word. A memory designed with a SbEC-DbED code can continue to function when a memory chip fails, regardless of its failure mode. When there are two failing chips that line up in the same ECC word sometime later, the SbEC-DbED code would provide the necessary error detection and protect the data integrity for the memory.

Existing and imminent memory systems utilize eighteen memory devices. However, the present SbEC-DbED error correcting codes utilize 36 memory devices in order to provide chipfail correction and detection. Thus, the cost increases due to the added expense of 36 memory devices for error correcting purposes and they are inflexible because they do not scale (adapt) to the memory systems with eighteen memory devices. Furthermore, the various circuits for encoding and decoding the errors are complex. Thus, this increases the cost and design of computer systems to insure data integrity.

BRIEF DESCRIPTION OF THE FIGURES

The present invention is illustrated by way of example and not limitation in the Figures of the accompanying drawings.

DETAILED DESCRIPTION

The following description provides a method, apparatus, and system for error detection and correction of memory devices. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, typical ECC code utilizes 36 memory devices for chipfail detection and correction that results in increased cost and design of a computer system. Also, with the advent of eighteen memory devices in a system, the present ECC codes do not scale. In contrast, the claimed subject matter facilitates a new ECC code, "adjacent-symbol" code that supports memory systems with 18 memory devices For example, in one embodiment, the claimed subject matter facilitates the ability for decoding and correcting memory errors in systems that utilize 18 memory devices for a memory transaction (memory rank). Furthermore, the claimed subject matter facilitates forming a code word of data with only two clock phases. Also, the adjacent-symbol ECC code corrects any error pattern within the data from one memory device and detects various errors (double device errors) from failures in 2 memory devices.

In one embodiment, the adjacent-symbol ECC code is utilized for a memory system with two channels of Double Data Rate (DDR) memory, wherein each channel is 64 bits wide with eight optional bits for ECC. Also, the memory system may utilize x4 or x8 wide memory devices (x4 and x8 refers to the number of bits that can be output from the memory device). Thus, the claimed subject matter supports various configurations of memory systems. For example, a memory system with x8 devices would utilize 18 memory devices per memory rank if ECC is supported, otherwise, 16 memory devices per memory rank if ECC is not supported. Alternatively, a memory system with x4 devices would utilize 36 memory devices per memory rank if ECC is supported, otherwise, 32 memory devices per memory rank if ECC is not supported.

Figure 1:
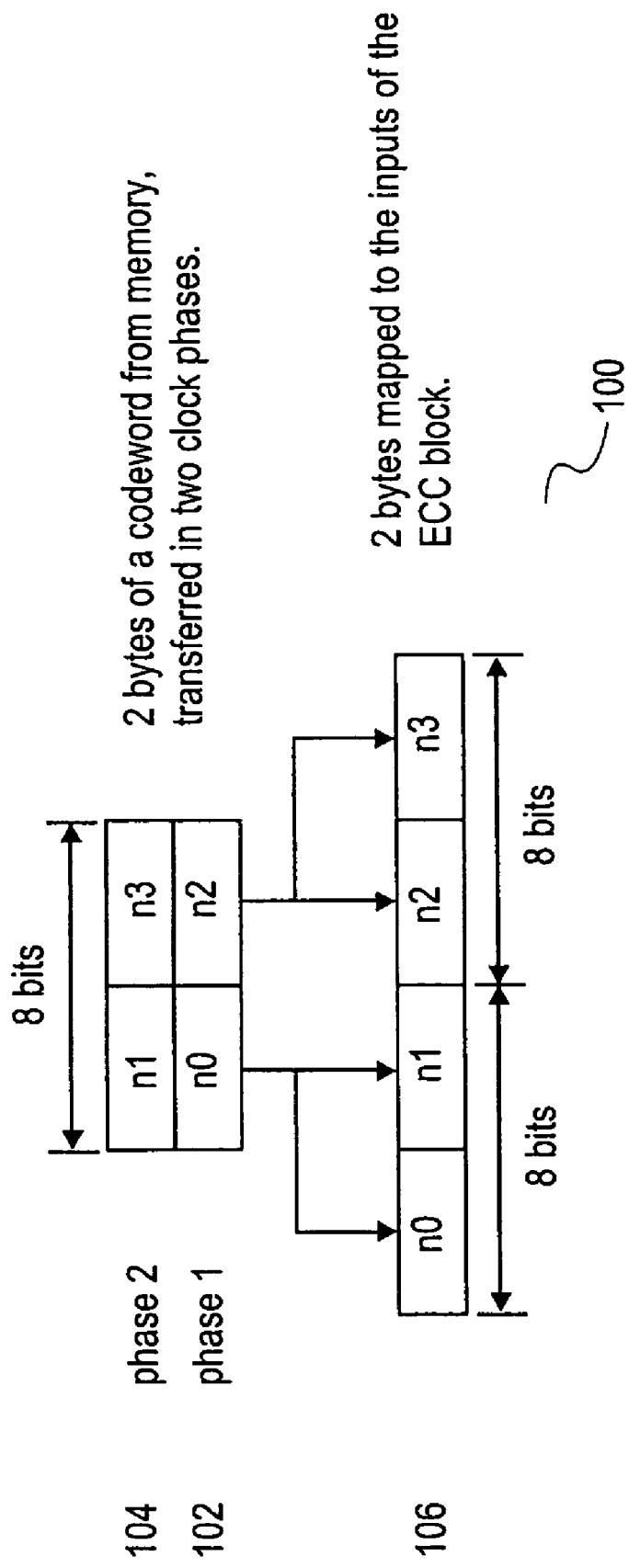
FIG. 1 illustrates a block diagram of a code word utilized in an embodiment.

FIG. 1 illustrates a block diagram of a code word utilized in an embodiment. The block diagram 100 comprises an adjacent symbol codeword 106 to be formed from two clock phases of data 102 and 104 from a memory device. For example, in one embodiment, a memory access transaction comprises a transfer of 128 data bits plus an additional 16 ECC check bits per clock edge, for a total of 144 bits for each clock edge (288 bits for both clock edges). In a first clock phase 102, a first nibble "n0" and a second nibble "n2" of data from a memory are transferred and mapped to a first nibble of each of two symbols of the codeword 106. Subsequently, during a second clock phase 104, a first nibble "n1" and a second nibble "n3" from a memory are transferred and mapped to a second nibble of each of two symbols of the codeword 106. Thus, the two symbols of the codeword 106 are adjacent and are on a 16 bit boundary of the code word, which are designated as "adjacent symbols", thus, the codeword 106 is an adjacent symbol codeword.

The scheme illustrated in the block diagram facilitates error detection and improves fault coverage of common mode errors. For example, for an x4 memory device, there is a one to one mapping of nibbles from the x4 memory device to a symbol in the underlying code word. In contrast, for a x8 memory device, there is a one to one mapping of nibbles from half of the x8 memory device to a symbol in the underlying code word Thus, the claimed subject matter facilitates isolating common mode errors across nibbles to the symbol level and results in increased fault coverage. Therefore, for the x8 memory device, the claimed subject matter precludes aliasing for a second device failure. Likewise, device errors in the x4 memory devices are isolated to a single symbol in the codeword 106, thus, there is complete double device coverage for the x4 memory devices.

To further illustrate, there are typically two classes of double device failures, simultaneous and sequence, that occur in the same memory rank.

A simultaneous double device failure has no early sign warning because there is no indication of an error in a previous memory transaction. Typically, the computer system reports an uncorrectable error in the absence of an aliasing. However, the system might incorrectly report a correctable single device failure. This time the aliasing may be discovered in subsequent accesses because an error pattern might change as to preclude the alias.

In contrast, a sequential double device failure is a more typical failure pattern than a simultaneous double device failure. Typically, the first device error is detected as a correctable error. For a second device failure, there may be two outcomes in one embodiment; the error is reported as uncorrectable, otherwise, the error is reported as a correctable error at a new location. In the event of an uncorrectable error for the second device failure, the analysis is complete. Otherwise, the system changes the error location from the first device failure to the second device's failure location. Therefore, the preceding method for detecting the alias is accurate because it is unlikely that the first device failure location resolves itself and even less likely that is does at the simultaneous instant that the second device failure has failed.

A few examples of double device errors that are always detected (no aliasing) are double bit errors, double wire faults, wire faults in one memory device with a single bit error in a second memory device, and a fault that affects only one nibble of each memory device.

In one example of a device error for the x8 memory device, all 16 bits of the codeword (adjacent symbols) may be affected (corrupted) because the failure results in an error for both nibbles and both clock phases of the memory device's data. Thus, the claimed subject matter facilitates the correction of this device failure by first correcting the 16 bits that are in error. However, in the event of a second memory device failure, the code detects the error pattern in two groups of 16 bits which are aligned on 16-bit boundaries in the code word 106.

Figure 2:
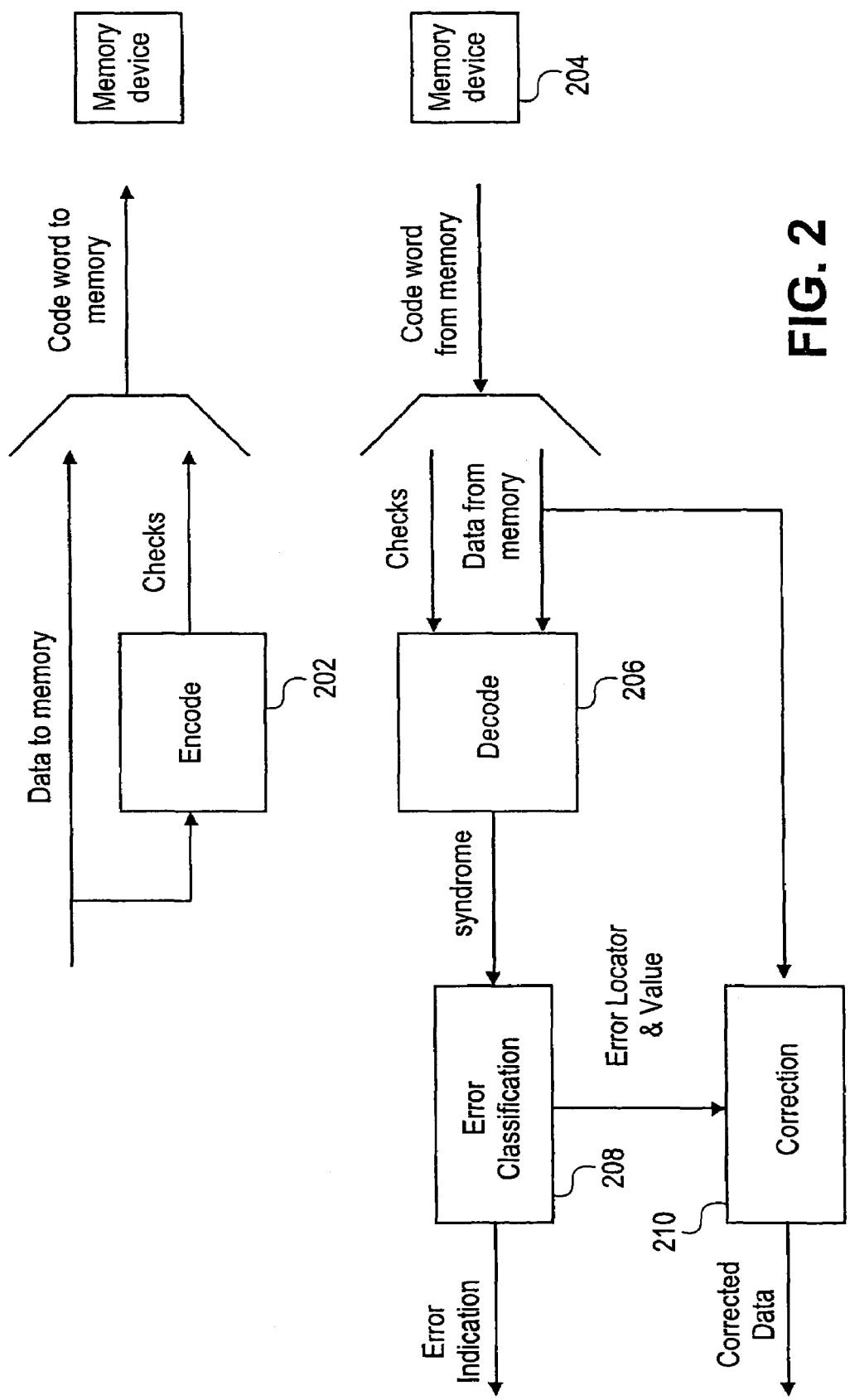
FIG. 2 illustrates an apparatus utilized in an embodiment.

FIG. 2 illustrates an apparatus utilized in an embodiment. From a high-level perspective, the apparatus generates a code word by creating check bits to be appended to data that is forwarded to memory. Subsequently, the apparatus generates a syndrome based at least in part on decoding the code word received from memory and facilitates classifying errors and correcting the errors. In one embodiment, the code word from the memory device is an adjacent symbol codeword that was described in connection with FIG. 1.

The apparatus comprises an encoder circuit 202, at least one memory device 204, a decoder circuit 206, an error classification circuit 208, and a correction circuit 210.

The encoder circuit receives data that is to be forwarded to the memory device or memory devices 204. The encoder circuit generates a plurality of check bits based at least in part on the data. Thus, a codeword is formed based at least in part on the plurality of check bits and the data and is forwarded to the memory device or memory devices 204.

In one embodiment, the check bits are generated from the binary form of a G-matrix, wherein the matrix has 32 rows and 256 columns to form 32 check bits. The check bits are computed as follows:

$c_i = \Sigma d_j \times G_{ij}$ for i=0 to 31 and j=0 to 255

For binary data, the multiply operation becomes an AND function and the sum operation the 1-bit sum or XOR operation. Thus, the resulting encoding circuit comprises 32 XOR, each tree computing one of the 32 check bits.

Subsequently, the memory device or memory devices 104 returns data and the check bits back to the decoder circuit 106. In one embodiment, the decoder circuit generates a 32-bit syndrome based at least in part on a 288-bit code word (as earlier described in connection with FIG. 1 for the 288-bit code word).

In one embodiment, the syndrome is generated from an H-matrix, wherein the matrix comprises 32 rows and 288 columns. Each syndrome bit is calculated as follows:

$s_i = \Sigma v_j \times H_{ij}$ for i=0 to 31 and j=0 to 287

As previously described with the encoder circuit, the generation of the syndrome bits is simplified to a XOR operation over the code word bits corresponding to the columns of the H-matrix that have a binary 1 value. Thus, the decoding circuit comprises 32 XOR trees, each tree computing one of the 32 syndrome bits. Therefore, in one embodiment, a 32 bit syndrome is generated by an H matrix receiving a 288 bit codeword. However, the claimed subject matter is not limited to this bit configuration. One skilled in the art appreciates modifications to the size of the syndrome and codeword.

The error classification and error correction are described in connection with FIG. 4.

Figure 3:
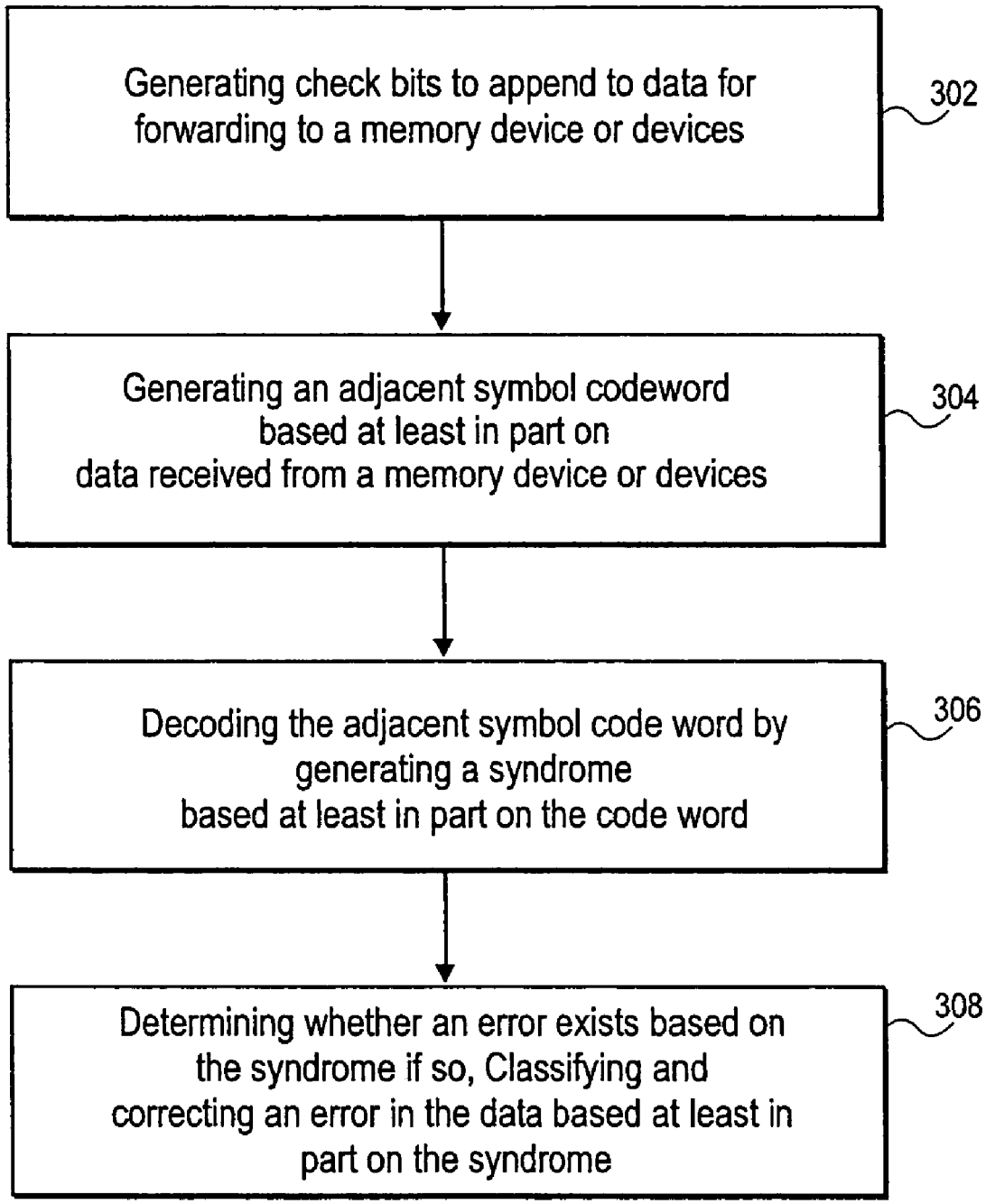
FIG. 3 illustrates a flowchart of a method utilized in an embodiment.

FIG. 3 depicts a flowchart for a method utilized in an embodiment. The flowchart depicts a method for detecting whether there were errors in data in a transaction with a memory device or devices. A first block 302 generates check bits to be appended to data for forwarding to a memory device or devices. An adjacent symbol codeword is generated based at least in part on data received from the memory device or devices to be utilized for checking the integrity of the data, as depicted by a block 304. A decoder generates a syndrome based at least in part on the adjacent symbol codeword, as depicted by a block 306. In the presence of an error as determined by the syndrome, an error classification and correction is performed, as depicted by a block 308.

Figure 4:
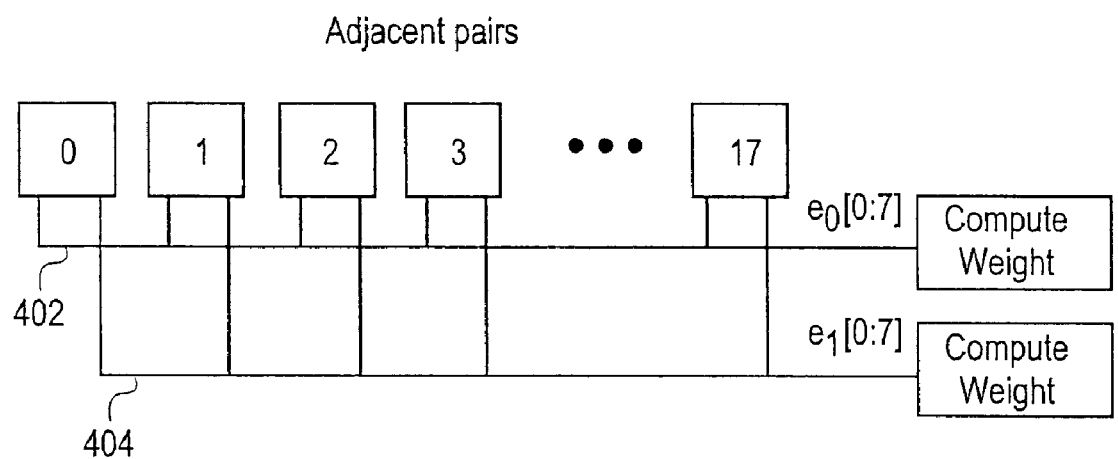
FIG. 4 illustrates an apparatus utilized in an embodiment described in connection with FIG. 2.

FIG. 4 illustrates an apparatus utilized in an embodiment described in connection with FIG. 2. As previously described, FIG. 4 describes one embodiment of the error classification and error correction in connection with FIG. 2.

The error classification is based at least in part on the decoding circuit's computation of the syndrome. For example, in one embodiment, if the syndrome (S)=0, then there is NO error. Otherwise, if the syndrome (S)>0, there is an error. Also, it is optional to further classify the error by computing an error location vector L. For example, in one embodiment, the error is uncorrectable if L=0. Otherwise, the error is correctable in an indicated column if L>0. Furthermore, one may further classify the correctable error as whether the error occurs in a data column or check column. For example, if the error is in a check column, the data portion of the code word may bypass the correction logic.

In yet another embodiment, a single device correctable error may be classified based at least in part on a weight of the error value. As depicted in FIG. 4, an adjacent pair may generate error values eo and e1. Thus, the error locator vector L is then used to gate the error values on a plurality of busses, 402 and 404 because the circuits allow for the error locator bits for one adjacent pair will be enabled for a given error pattern.

Thus, the claimed subject matter allows for test coverage of both single and double device errors.

Figure 5:
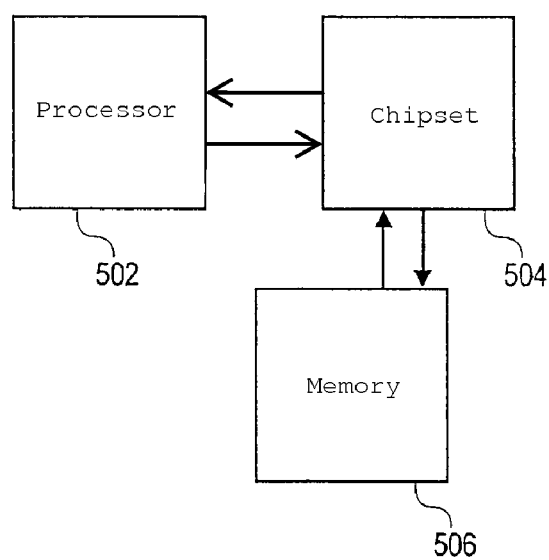
FIG. 5 illustrates a system utilized in an embodiment.

FIG. 5 depicts a system in accordance with one embodiment. The system in one embodiment is a processor 502 that is coupled to a chipset 504 that is coupled to a memory 506. For example, the chipset performs and facilitates various operations, such as, memory transactions between the processor and memory and verifies the data integrity by utilizing the adjacent symbol codeword as described in connection with FIG. 1. In one embodiment, the chipset is a server chipset to support a computer server system. In contrast, in another embodiment, the chipset is a desktop chipset to support a computer desktop system. In both previous embodiments, the system comprises the previous embodiments depicted in FIGS. 1-4 of the specification to support the adjacent symbol codeword and error correction and detection methods and apparatus.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus for an Error Correcting Code comprising:
 a first logic to generate a plurality of check bits based on a set of data, to append the check bits to the set of data that is to be forwarded to a memory;
 a second logic to receive a codeword from the memory and to generate a syndrome based on the codeword, and to detect whether an error exists based on the syndrome;
 a third logic to classify the error if it exists, wherein existence of an error is to be determined based on a syndrome and wherein a single device error is to be classified in response to a determination of a weight of a plurality of error values; and
 a fourth logic to correct the error if it exists, wherein an error location vector is to gate the error values on a plurality of busses.

2. The apparatus of claim 1 is incorporated within a server chipset.

3. The apparatus of claim 1 wherein the memory is a Double Data Rate (DDR) memory.

4. The apparatus of claim 1 wherein the syndrome is thirty two bits and the codeword is 288 bits.

5. The apparatus of claim 1 wherein the first logic is an encoder and utilizes the formula:

$$c_i = \Sigma d_j \times G_{ij} \text{ for } i=0 \text{ to } 31 \text{ and } j=0 \text{ to } 255,$$

to generate the plurality of check bits, wherein G corresponds to a matrix and d corresponds to the set of data.

6. The apparatus of claim 1 wherein the second logic is a decoder and the syndrome is an H matrix that is generated by the formula:

$$s_i = \Sigma v_j \times H_{ij} \text{ for } i=0 \text{ to } 31 \text{ and } j=0 \text{ to } 287,$$

to generate the syndrome, wherein H corresponds to a matrix and v corresponds to the code word.

7. An apparatus to classify an error from a memory comprising:
 a first logic circuitry to generate an H matrix syndrome; and
 a second logic circuitry to determine whether an error exists based on the syndrome, if so, to classify an error type of the error, wherein a single device error is to be classified in response to a determination of a weight of error values, e0 and e1, wherein an error location vector is to gate the error values on a plurality of busses.

8. The apparatus of claim 7, wherein the H matrix syndrome is generated by the formula:
 $s_i = \Sigma v_j \times H_{ij}$ for i=0 to 31 and j=0 to 287, wherein H corresponds to a matrix and v corresponds to the code word.

9. The apparatus of claim 7 wherein to classify the error type comprises the first logic to generate the error location vector.

10. The apparatus of claim 9 wherein the error location vector determines whether the error is correctable:
 a value of zero in the error location vector indicates the error is uncorrectable; in contrast, a value that is greater than zero in an indicated column of the error location vector indicates the error is correctable.

11. The apparatus of claim 7 wherein the error type may be either a single device error or a double device error.

12. The apparatus of claim 11 wherein the double device error is either of a simultaneous error or a sequential error.

13. A system comprising:
 a processor, coupled to a memory and a chipset, to generate an operation to the memory via the chipset; and
 the chipset to utilize an Error Correcting Code (ECC) based on an adjacent symbol codeword that is formed in two clock phases and to determine whether an error exists in a plurality of data received by the chipset from the memory, if so, to classify a type of the error based on an H matrix syndrome, wherein existence of an error is to be determined based on the syndrome and wherein a single device error is to be classified in response to a determination of a weight of a plurality of error values, wherein an error location vector is to gate the error values on a plurality of busses.

14. The system of claim 13 wherein the memory is a Double Data Rate (DDR) memory.

15. The system of claim 13 wherein the H matrix syndrome is generated by the formula:
 $s_i = \Sigma v_j \times H_{ij}$ for i=0 to 31 and j=0 to 287, wherein H corresponds to a matrix and v corresponds to the code word.

16. The system of claim 13 wherein the system is a server.

17. The system of claim 13, wherein the error type may be either a single device error or a double device error.

* * * * *